US010922439B2

(12) United States Patent
Von Bokern et al.

(10) Patent No.: US 10,922,439 B2
(45) Date of Patent: Feb. 16, 2021

(54) TECHNOLOGIES FOR VERIFYING MEMORY INTEGRITY ACROSS MULTIPLE MEMORY REGIONS

(71) Applicant: Intel Corporation, Santa Clara, CA (US)

(72) Inventors: Vincent Von Bokern, Rescue, CA (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 16/023,683

(22) Filed: Jun. 29, 2018

(65) Prior Publication Data
US 2019/0042796 A1 Feb. 7, 2019

(51) Int. Cl.
G06F 21/64 (2013.01)
G06F 12/14 (2006.01)
G06F 21/60 (2013.01)
G06F 21/78 (2013.01)
H04L 9/32 (2006.01)
(Continued)

(52) U.S. Cl.
CPC .......... *G06F 21/64* (2013.01); *G06F 9/45558* (2013.01); *G06F 12/1408* (2013.01); *G06F 21/602* (2013.01); *G06F 21/78* (2013.01); *H03M 13/09* (2013.01); *H04L 9/3242* (2013.01); *G06F 2009/45583* (2013.01); *G06F 2212/1052* (2013.01); *G06F 2212/402* (2013.01); *H04L 2209/34* (2013.01)

(58) Field of Classification Search
CPC .... G06F 21/64; G06F 12/1408; G06F 21/602; G06F 21/78; G06F 9/45558; G06F 2009/45583; G06F 2212/402; G06F 2212/1052; H04L 9/3242; H04L 2209/34; H03M 13/09
See application file for complete search history.

(56) References Cited

U.S. PATENT DOCUMENTS 6,950,517 B2 * 9/2005 Hawkes ................ H04L 9/0637
380/277
7,340,602 B2 * 3/2008 Serret-Avila ............ G06F 21/64
713/161
(Continued)

OTHER PUBLICATIONS

Michael Kounavis, David Durham, Sergej Deutsch, Antonios Papadimitriou and Amitabh Das, "Cryptographic Constructions Supporting Implicit Data Integrity", May 2018, obtained from <https://eprint.iacr.org/2018/534.pdf>, retrieved on Apr. 26, 2020.*
(Continued)

*Primary Examiner* — Farid Homayounmehr
*Assistant Examiner* — Zhimei Zhu
(74) *Attorney, Agent, or Firm* — Alliance IP, LLC

(57) ABSTRACT

Technologies for verifying the integrity of regions of physical memory allocated among multiple domains are described. In embodiments the technologies include or cause: the generation of a first integrity value in response to a write command from a first domain; the generation of a second integrity value in response to a read command; and verifying the integrity of read data targeted by the read command at least in part by comparing the first integrity value to the second integrity value.

26 Claims, 7 Drawing Sheets

Write Flow

(51) Int. Cl.
*G06F 9/455* (2018.01)
*H03M 13/09* (2006.01)

(56) References Cited

U.S. PATENT DOCUMENTS

| | | | | |
|---|---|---|---|---|
| 7,836,387 | B1* | 11/2010 | Wong | H04L 63/123 |
| | | | | 714/819 |
| 9,882,720 | B1* | 1/2018 | Levy | H04L 9/3247 |
| 2004/0019783 | A1* | 1/2004 | Hawkes | H04L 9/0643 |
| | | | | 713/161 |
| 2008/0044012 | A1* | 2/2008 | Ekberg | H04W 12/0013 |
| | | | | 380/30 |
| 2008/0084996 | A1* | 4/2008 | Chen | H04L 9/0637 |
| | | | | 380/28 |
| 2012/0047580 | A1* | 2/2012 | Smith | G06F 21/53 |
| | | | | 726/24 |
| 2012/0110336 | A1* | 5/2012 | Frey | G06F 12/1408 |
| | | | | 713/181 |
| 2013/0067245 | A1* | 3/2013 | Horovitz | G06F 21/57 |
| | | | | 713/193 |
| 2015/0161059 | A1* | 6/2015 | Durham | G06F 21/64 |
| | | | | 713/193 |
| 2017/0201503 | A1* | 7/2017 | Jayasena | G06F 21/71 |
| 2018/0165224 | A1* | 6/2018 | Brown | G06F 21/53 |
| 2018/0205576 | A1* | 7/2018 | Morita | H04L 9/32 |
| 2019/0042765 | A1* | 2/2019 | Chung | G06F 21/85 |
| 2019/0042795 | A1* | 2/2019 | Bolotov | G06F 21/79 |
| 2019/0197259 | A1* | 6/2019 | Bettale | H03M 13/096 |
| 2019/0251275 | A1* | 8/2019 | Ramrakhyani | G06F 3/0673 |
| 2019/0347432 | A1* | 11/2019 | Boivie | G06F 21/57 |

OTHER PUBLICATIONS

Gueron, Shay. "A Memory Encryption Engine Suitable for General Purpose Processors." IACR Cryptol. ePrint Arch. 2016 (2016): 204.*

* cited by examiner

Write Flow

Read Flow

TECHNOLOGIES FOR VERIFYING MEMORY INTEGRITY ACROSS MULTIPLE MEMORY REGIONS

FIELD

The present disclosure relates to technologies for verifying memory integrity across multiple memory regions. In particular, the present disclosure relates to systems, devices, methods, and computer readable media for verifying memory integrity in the context of physical memory regions allocated to one or more domains, such as one or more virtual machines.

BACKGROUND

Virtualization in information processing systems allows multiple instances of one or more operating systems (OSes) to run on a single information processing system (e.g., a computer, server or the like), even though each OS is designed to completely and directly control the system and its resources. Virtualization is often implemented with software, firmware, or hardware such as a virtual machine monitor (VMM; also known as a hypervisor) that is configured to present to each OS a virtual machine (VM) that has virtual resources (e.g., one or more virtual processors, virtual main memory (RAM), virtual storage, and the like) that the OS can control. The VMM may be configured to maintain a system environment for implementing policies that allocate physical resources of the system among the virtual machines—i.e., the virtualization environment. Each OS and any other software executing on a virtual machine may be referred to as a "guest" or "guest software," whereas a "host" or "host software" may refer to a VMM or other software that is executed outside of the virtualization environment (i.e., outside of any virtual machine).

Some systems that support virtualization include a memory controller that is configured to translate virtual memory addresses (associated with virtual memory allocated to a virtual machine) to physical memory addresses (of the host system). The memory controller may also be configured to isolate and protect regions of host physical main memory (e.g., random access memory) that are allocated to different virtual machines supported by the host device. Isolation and protection of the physical memory regions may be maintained using range-based controls, cryptographic methods, or other means.

A memory controller may use range-based controls to associate regions of physical memory of a host system with guest domains (e.g., virtual machines) executing on the host. In such instances when a read or write command enters the memory controller, the memory controller may determine which domain (virtual machine) produced the command and which regions of the physical memory of the host are targeted by the command (or, more specifically, which region of physical memory includes physical memory addresses that map to virtual addresses of the virtual machine of the domain issuing the command. A processor may cause the memory controller to execute the command if the domain is authorized to read/write from/to the physical memory region targeted by the request, or the processor may deny execution of the command if the domain is unauthorized to access that physical memory region.

The content of host physical memory can also be protected using cryptographic methods such as multiple key total memory encryption (MKTME). In MKTME a memory controller is configured to protect the data stored in the physical memory space allocated to one domain (virtual machine) from unauthorized access by another domain (virtual machine) by encrypting data to be written to physical memory with an encryption key that is specific to the guest that is requesting the write (i.e., a "per-domain encryption key"). Doing so can thwart unauthorized reads of data within a first physical memory region allocated to a first domain (virtual machine) by a second domain (virtual machine), because the content of the first physical memory region is encrypted with the first domain's encryption key—to which the second domain does not have access.

While range-based controls and MKTME can effectively isolate and protect physical memory regions allocated to different domains, they do not provide a mechanism for checking the integrity of data stored to physical memory of a host system. Consequently, such methods may be exposed to attacks where an unauthorized domain (attacking domain) causes an unauthorized write to a memory region allocated to another domain (victim domain), resulting in an unauthorized modification of the content of physical memory allocated to the victim domain. The victim domain may also be unaware that the content of its allocated physical memory has been altered by an unauthorized write.

Technologies such as INTEL® secure enclave (e.g., implemented using Intel® Software Guard Extensions (SGX)) technology utilize a memory encryption engine (MEE) that can maintain confidentiality, integrity, and hardware replay protection using a single key. For example, the MEE used in a secure enclave implementation can build a metadata tree over a protected region of physical memory. The integrity of data read from the protected region of memory can be verified by walking the metadata tree. Although effective for verifying the integrity of data stored in the enclave, walking the metadata tree may entail multiple access to memory each time the data stored in the enclave is accessed. Thus, Secure Enclaves can provide strong data protection and integrity verification capabilities. For some applications, however, a somewhat reduced level of security assurance (relative to that provided by a Secure Enclave) may be considered acceptable—particularly in instances where reduced integrity verification latency is desired. Integrity verification technologies that protect against physical attacks are also of interest.

In view of the foregoing, interest has grown in technologies that provide a lightweight mechanism for ensuring memory integrity across isolated memory domains, and which can protect against physical attacks (e.g., external modification of DRAM content).

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Figure 1:
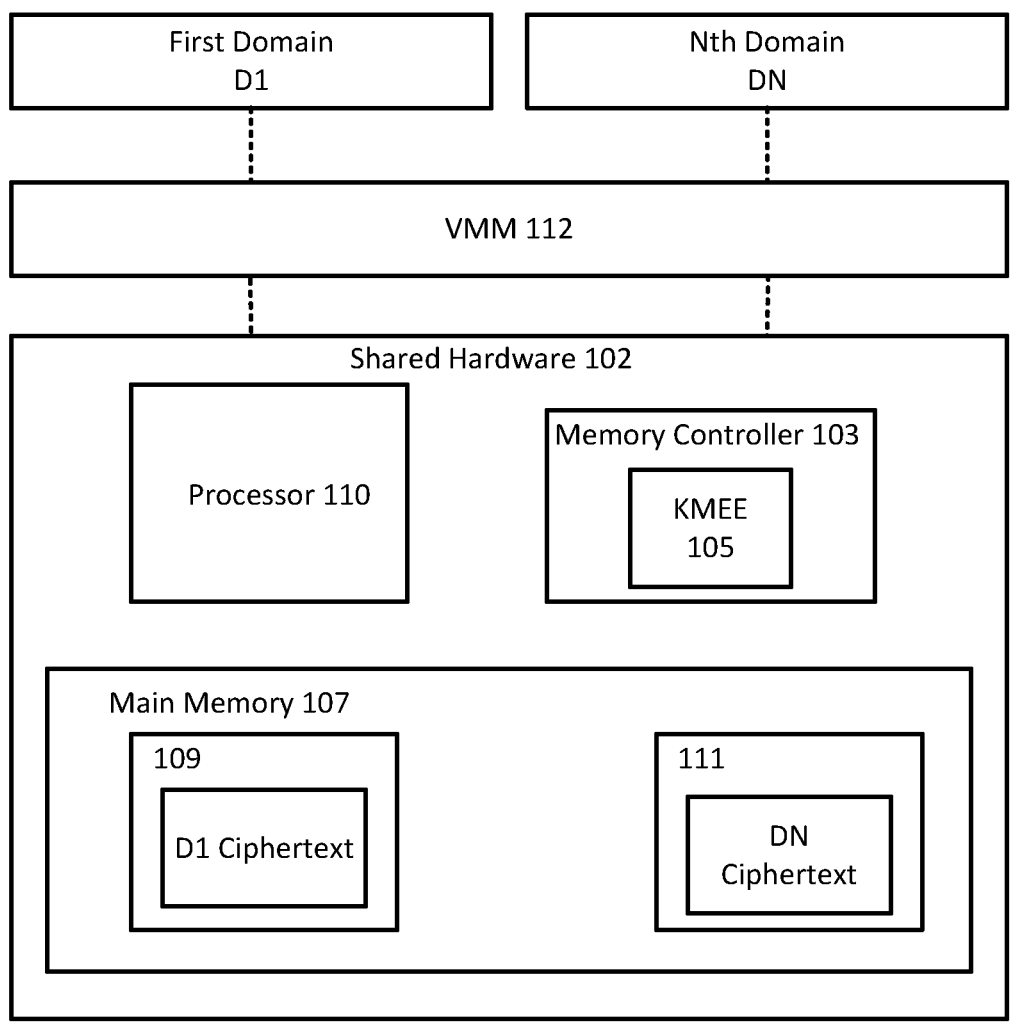
FIG. 1 is a block diagram illustrating one example of a system for maintaining isolation between allocated regions of physical main memory of a host device.

The technologies of the present disclosure are described herein with reference to illustrative embodiments for particular applications. For the sake of illustration and ease of understanding the technologies described herein are discussed in the context of a virtualized system in which physical main memory (e.g., random access memory) of a host device is allocated among several domains (e.g., virtual machines) executed within the context of a virtualized environment implemented by the host device. Such discussions are for the sake of example only, and all or a portion of the technologies described herein may be used in other contexts. For example, the technologies described herein may be used in the context of any memory system in which memory integrity between isolated memory regions is desired, such as but not limited to a non-virtualized system. Those skilled in the relevant art(s) with access to the teachings provided herein will recognize additional modifications, applications, and embodiments within the scope of this disclosure, and additional fields in which embodiments of the present disclosure would be of utility.

The terms "host," and "host device," are interchangeably used herein to refer to the wide range of electronic devices that may be configured to include a memory architecture in which regions of memory (e.g., RAM) are allocated among different domains. For the sake of illustration the domains are described in the context of a virtualized system, and therefore may be understood as virtual machines. As noted above, however, the technologies described herein may be implemented in any context in which verification of the integrity of the content of physical memory of a host system is desired. Non-limiting examples of suitable host devices include cameras, cell phones, computer terminals, desktop computers, a distributed computing system, electronic readers, facsimile machines, kiosks, netbook computers, notebook computers, internet devices, payment terminals, personal digital assistants, media players and/or recorders, servers, set-top boxes, smart phones, tablet personal computers, televisions, ultra-mobile personal computers, wired telephones, combinations thereof, and the like. Such devices may be portable or stationary. Without limitation, the host devices described herein are preferably in the form of desktop computer, server, distributed computing system, or the like.

The term "main memory" is used herein to refer to memory that is available to the CPU through load/store instructions (as opposed to the use of a driver and input/output controller used to read/write to storage, e.g., of a host device (physical main memory) or of a domain/virtual machine (virtual main memory). Examples of main memory that may be used include (e.g., volatile or non-volatile) random access memory (RAM), such as but not limited to double data rate (DDR) RAM (e.g., DDR2, DDR3, DDR4, DDR5, low power DDR (LPDDR)) three-dimensional cross point memory, INTEL® OPTANE® memory, or any other present or future developed memory. Without limitation, in embodiments the main memory described herein is in the form of DDR or three-dimensional cross point memory that includes integrity value bits (e.g., metadata bits) and data storage bits. In contrast, the terms "disk," "storage," and "storage device" are used interchangeably herein to refer to one or more non-volatile memory devices that may be used to provide non-volatile data storage. Non-limiting examples of storage devices that may be used herein include magnetic storage devices (e.g., magnetic hard drives, magneto-optical drives, thermally assisted magnetic recording devices, magnetic disks, etc.), solid state storage devices (e.g., storage devices employing non-volatile solid state NOT AND (NAND) or NOT OR (NOR) memory), memory sticks and/or cards including non-volatile memory, combinations thereof, and the like.

The phrase "encryption operations" is used herein to generally refer to the encryption of plaintext into ciphertext, the decryption of ciphertext into plaintext, or some combination thereof, as appropriate. The term "encryption operations" should therefore be understood to encompass both encryption and decryption of data, with the appropriate interpretation being given based on the context in which the phrase is used.

The term "module" is used herein to refer to software, firmware and/or circuitry that is/are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as field programmable gate arrays (FPGAs), application specific integrated circuits (ASICs), general purposes computer processors comprising one or more individual instruction processing cores, state machine circuitry, software and/or firmware that stores instructions executed by programmable circuitry. The modules described herein may, collectively or individually, be embodied as circuitry (e.g., as logic implemented at least in part in hardware) that forms all or a part of one or more host devices.

Modern computing systems are often configured as a host device that supports multiple domains, such as but not limited to one or more virtual machines. Each domain may be allocated virtual resources that map or otherwise correspond to all or a portion of the physical resources of the host device (e.g., by a virtual machine monitor VMM or hypervisor). For example, each domain may be allocated all or a portion the physical processing resources, main memory resources (physical RAM), physical storage, input/output device capabilities, etc. of a host device. Allocation of host resources to the domain(s) may be in accordance with one or more virtualization policies implemented by the VMM/hypervisor. For security and other reasons, different regions of physical main memory of the host device may be allocated to different domains, and may be isolated or otherwise protected from one another. Isolation of the physical memory regions may be maintained using range-based controls, and the content of the physical memory regions may be protected cryptographically, e.g., using domain specific encryption keys (i.e., encryption keys that are unique to each domain, and which are only accessible by the domain with which they are associated).

FIG. 1 is a block diagram of one example of a system for maintaining memory isolation in the context of virtualization. In this instance system 100 is in the form of a host device that includes shared hardware 102 and a virtual machine monitor (VMM) 112. VMM 112 may be implemented as host software (e.g., executing on shared hardware 102), as would be understood by one of ordinary skill in the art. In any case, VMM 112 (and system 100 as a whole) is configured to support virtualization, such that a plurality of domains (e.g., virtual machines) may be executed within a virtualization environment established or otherwise supported by VMM 112. That concept is illustrated in FIG. 1, which depicts system 100 as hosting a first domain D1 and an Nth domain DN, though any suitable number of domains may be hosted by system 100.

Shared hardware 102 generally includes physical resources of a host device. For clarity and ease of understanding, FIG. 1 depicts shared hardware 102 as including a memory controller 103, a processor 110, and main memory (e.g., RAM) 107, but omits various other physical resources of system 100 that may be included in shared hardware 102. For example, shared hardware 102 may also include other resources such as storage resources (e.g., from one or more non-volatile storage devices), communications resources (e.g., wired and/or wireless networking resources), video processing resources (e.g., from one or more dedicated video processing components such as graphics cards), combinations thereof and the like. The simplified representation of shared hardware 102 is carried through to the other FIGS., particularly FIG. 2.

System 100 (or, more particularly VMM 112) is configured to allocate virtual resources to domains D1, DN, wherein those virtual resources correspond to all or a portion of the physical resources provided by shared hardware 102. In that way, shared hardware 102 may be allocated among D1 and DN. For example, VMM 112 may allocate virtual memory to D1 and DN. Processor 110 may be configured to map the virtual memory of D1 to a first region 109 of main memory 107, and to map the virtual memory of DN to a second region 111 of main memory 109 to DN. During the operation of system 100, one or both D1 and DN may be active and executing code, e.g., on one or more virtual processors. As their virtual processors execute code, D1 and DN may issue read and write commands to their respective virtual main memories. Memory controller 103 may be configured to determine from which domain the read/write command was issued, and execute the corresponding action by reading/writing date to corresponding physical memory addresses of regions 109, 111. Memory controller 103 may also be configured to isolate memory regions 109, 111 from one another (e.g., with range-based controls).

Figure 2:
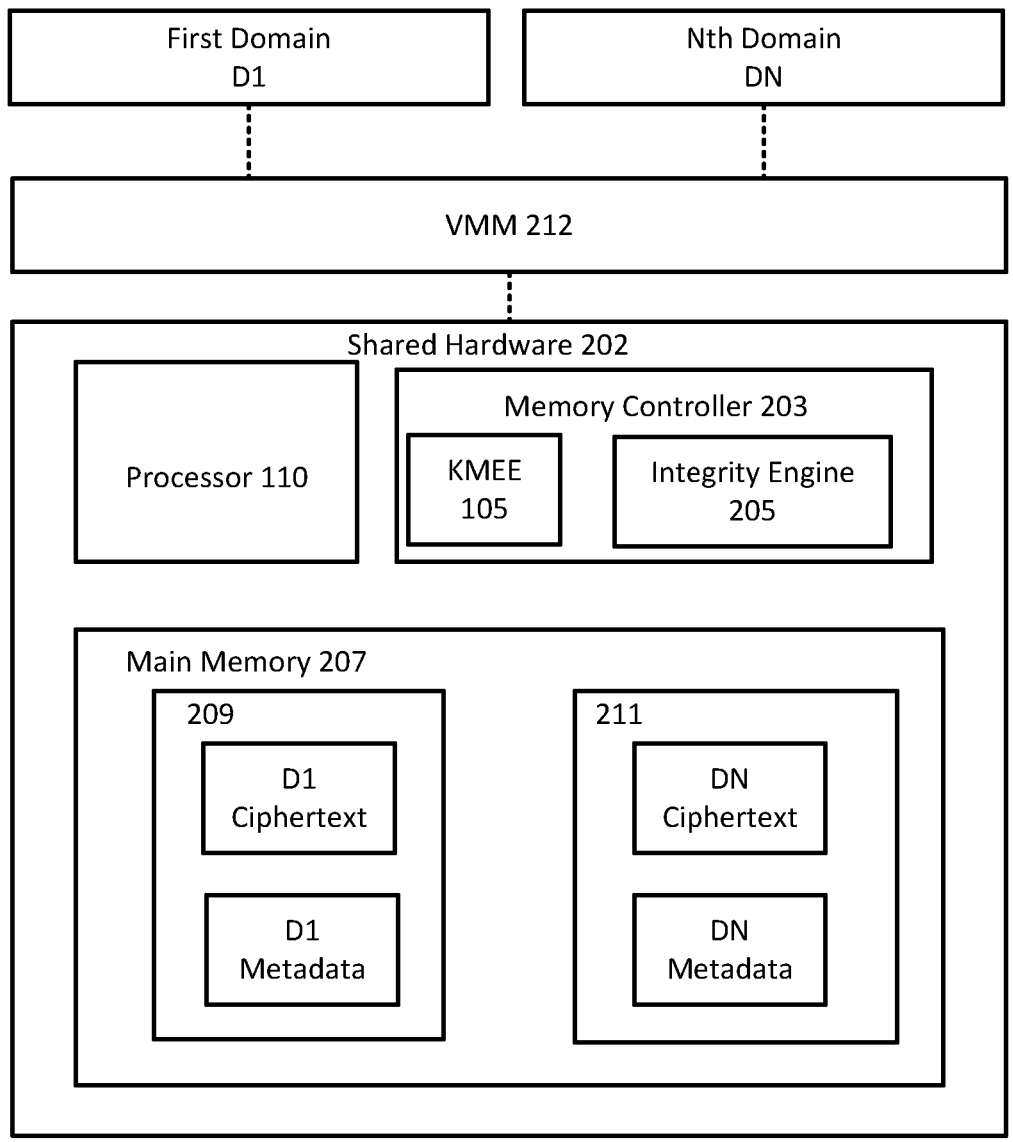
FIG. 2 is a block diagram illustrating one example of a system for maintaining integrity of allocated regions of physical main memory of a host device, consistent with the present disclosure.

It is noted that while FIGS. 1 and 2 depict the use of a memory controller (103, 203) as a standalone component of shared hardware, such a configuration is not required. Indeed, in embodiments the memory controllers described herein may be standalone devices or may be integral with another component of shared hardware of a host device, such as one or more processors (e.g., processor 110), a dedicated memory controller (e.g., on a motherboard), combinations thereof, or the like. Without limitation, in embodiments the memory controllers described herein are integral with one or more physical processors of host device. For example, in embodiments the memory controllers described herein are integral with processor 110. In that regard, processor 110 may be any suitable general-purpose processor or application specific integrated circuit. Without limitation, in embodiments memory controller 103 is integral with processor 110, and processor 110 is one or more single or multicore processors produced by INTEL® corporation, APPLE® corporation, AMD® corporation, SAMSUNG® corporation, NVIDIA® corporation, combinations thereof, or the like.

Although memory controller 103 may implement range-based controls or other techniques to limit access to regions 109, 111 by an unauthorized domain, such techniques may be compromised by hypothetical, future hardware attacks. Thus, memory controller 103 may also be configured to protect the content of memory regions 109, 111 from unauthorized access. For example, memory controller 103 may protect the content of memory regions 109, 111 cryptographically. In that regard memory controller 103 may include a key management and encryption engine (KMEE) 105 that utilizes domain specific encryption keys to encrypt or decrypt the content of regions 109, 111. Domain specific encryption keys are encryption keys that are specific to a domain with which they are associated, and are not accessible to another domain. Thus, KMEE 105 may utilize a first encryption key that is specific to region 109 and a second encryption key that is specific to region 111. The first encryption key may only be accessible to D1, whereas the second encryption key may only be accessible to DN. In any case, KMEE 105 (or, more generally, memory controller 103) may use domain specific encryption keys to encrypt data prior to writing it to regions 109, 111 of main memory 107. KMEE 105 (or, more generally, memory controller 103) may also use a domain specific decryption key (e.g., which may be the same as or derived from a corresponding domain specific encryption key) to decrypt data as it is read from an allocated region of main memory 107. In instances where the encryption and decryption keys are the same, KMEE 105 may be understood to implement symmetric encryption operations.

More specifically, when D1 is active a virtual processor of D1 may cause the issuance of a write command to cause a write to be made to virtual memory allocated to D1. In response, memory controller 103 may determine that the write command was issued by D1. Memory controller 103 may then encrypt the data that is the target of the request ("write data") with a first encryption key that is specific to D1 and store the resulting encrypted write data to region 109 of main memory 107. In contrast when DN is active, a virtual processor of DN may cause the issuance of a write command to cause a write to be made to virtual memory allocated to DN. Memory controller 103 may determine that the write command was issued by DN. Memory controller 103 may then encrypt the write data associated with the write command using a second encryption key that is specific to DN, and store the resulting encrypted write data to region 109 of main memory 107.

In the read context, D1 and DN may cause the issuance of read commands targeting virtual addresses of their respective virtual memory. In response, memory controller 103 may determine from which domain a read command was issued. Memory controller 103 may then read the data targeted by the read command from the identified physical addresses, e.g., from regions 109, 111, as appropriate. Because the content of regions 109, 111 is encrypted by a domain specific encryption key, the data read by memory controller 103 will be in the form of ciphertext. Accordingly, memory controller 103 may further service the read command by decrypting the ciphertext read from regions 109, 111 with a corresponding decryption key.

In the case of ciphertext read from region 109, the decryption key may be derived from the first encryption key (i.e., the domain specific encryption key associated with region 109). Alternatively, in the case of ciphertext read from region 111, the decryption key may be derived from the second encryption key (i.e., the domain specific encryption key associated with region 111). Because the domains D1, DN only have access to their respective encryption key, the content of region 109 is protected from an unauthorized read command from DN (targeting region 109), and the content of region 111 is protected from an unauthorized read command from D1 (targeting region 111). More specifically, while DN could potentially obtain the content of region 109, the content will be ciphertext and unintelligible to DN as it lacks D1's encryption key. Likewise, while D1 could potentially obtain the content of region 111, the content will be ciphertext and unintelligible to D1 as it lacks DN's encryption key.

In sum, system 100 is configured to maintain isolation of memory domains 109, 111 using range-based controls, and to cryptographically protect the content of regions 109, 111 from unauthorized reads with domain specific encryption and decryption keys. However, system 100 does not provide a mechanism for checking the integrity of data stored to allocated memory regions 109, 111. Consequently, such methods may be exposed to attacks where an unauthorized (attacking) domain causes an unauthorized write to a memory region allocated to another (victim) domain.

For example, a malicious entity executing within DN may cause the issuance of unauthorized write commands that target the physical memory allocated to D1, i.e., region 109. Assuming the mechanism(s) implemented by system 100 to isolate region 109 from other regions of main memory 107 (e.g., range-based controls) has/have not been compromised, execution of the unauthorized write commands that target region 109 may be denied. If such mechanisms have been compromised, however, the unauthorized write command issued by DN may cause memory controller 103 to write unauthorized data to region 109—potentially compromising the integrity of data stored therein.

Various attacks have been developed to circumvent the isolation of memory regions with range-based controls. One such attack is the so-called "rowhammer" attack. Using the rowhammer attack, a malicious entity executing within DN may cause the memory controller 103 to repeatedly and quickly hit the row buffer of the main memory 107, causing random bit flip errors to occur within region 109. Such bit flips may potentially create opportunities for the malicious entity executing within DN to cause unauthorized data to be written to region 109. That unauthorized data may not be detected by D1, as system 100 does not provide a mechanism for verifying the integrity of data written to main memory 107 (or, more particularly, to allocated regions 109, 111 thereof).

With the foregoing in mind, aspects of the present disclosure relate to technologies for maintaining the integrity of regions of physical memory that are allocated among multiple domains. The technologies described herein include devices, systems, methods, and computer readable media that cause the generation of a first integrity value in response to a write command issued by a first domain, wherein the write command targets (i.e., is mapped to) a region of physical main memory (allocated memory region) of a host device (e.g., RAM) that is allocated to the first domain. In embodiments the first integrity value is a data structure generated (e.g., by a memory controller) at least in part from the (optionally truncated) output of a first integrity operation on the plaintext of the data to be written in response to the write command (hereinafter, "plaintext write data"), and the (optionally truncated) output of a second integrity operation on ciphertext produced by encrypting the write data with an encryption key (hereinafter, "encrypted write data"). In response to the write command, the first integrity value may be written to the allocated memory region along with the encrypted write data. For example, the integrity value may be written to the allocated memory region as metadata that is associated with encrypted write data. In embodiments, the first integrity value is written to metadata bits within the allocated memory region, and the encrypted write data is written to data storage bits within the allocated memory region.

In response to a read command issued by the first domain, the integrity of the data to be read (e.g., read data) from an allocated memory region may be verified by determining a second integrity value from the plaintext and ciphertext of the data to be read (i.e., plaintext read data and encrypted read data), and comparing the second integrity value to the first integrity value. For example, a memory controller may receive a read command from a first domain, wherein the read command targets (e.g., maps to) physical memory addresses within a first region of physical main memory of a host device that is allocated to the first domain. In response to the read command, the memory controller may read encrypted read data from the physical memory addresses targeted by the read command, as well as a first integrity value associated with the encrypted read data. The encrypted read data may be stored in data storage bits of the allocated memory region, and the first integrity value may be stored in metadata bits associated with the data storage bits.

The memory controller may decrypt the encrypted read data to obtain plaintext read data. The memory controller may also generate a second integrity value based at least in part on the encrypted read data and plaintext read data. In embodiments the second integrity value is a data structure generated at least in part from the (optionally truncated) output of a first integrity operation performed on plaintext read data, and the (optionally truncated) output of a second integrity operation performed on the encrypted read data. The integrity of data targeted by the read command may then be verified by comparing the second integrity value to the first integrity value. If the first and second integrity values are the same (or differ by less than a threshold amount—though such would entail a reduced security level, the integrity verification may pass. If the first and second integrity values are different (or differ by more than a threshold amount—again, at a reduced security level), however, the integrity verification may fail. In the latter instance, operations may be performed to mitigate the impact of the altered content of the allocated region of host physical memory on the operation of the first domain, and/or on the host system Reference is now made to FIG. 2, which depicts one example of a system 200 for verifying the integrity of data stored to allocated regions of physical main memory, consistent with the present disclosure. Like system 100, system 200 is depicted in FIG. 2 in the context of virtualization. Thus, system 200 may be understood as a host device or system that includes shared hardware 202 and a virtual machine monitor (VMM) 212. VMM 212 may be implemented in hardware, firmware or software, and may be configured to establish a virtualization environment for hosting one or more domains (virtual machines) in accordance with one or more virtualization policies. For example, VMM 212 may allocate all or a portion of shared hardware among one or more virtual domains, e.g., domains D1, DN as shown in FIG. 2.

Shared hardware 202 may include many of the same components as shared hardware 102 of FIG. 1. For example, shared hardware 202 may include shared physical processing resources (e.g., processor 110), shared physical storage, shared communications resources, combinations thereof, and the like. Shared hardware 202 also includes a memory controller 203. Like memory controller 103, memory controller 203 may be configured to receive read and write commands that target virtual memory addresses of virtual memory allocated to D1, DN, and read/write data to/from corresponding physical addresses of shared main memory 207. Also like memory controller 103, memory controller 203 may be configured to isolate regions 209 and 211 from one another (e.g., with range based access controls), and to cryptographically protect the content of regions 209, 211 (e.g., using domain specific encryption/decryption keys managed by KMEE 105). Thus, as shown in FIG. 2, memory controller 203 may be configured to isolate first and second regions 209, 211 from one another, to store ciphertext of data associated with D1 (D1 ciphertext) in region 209, and to store ciphertext associated with DN (DN ciphertext) to region 211.

Like memory controller 103, memory controller 203 may be a standalone component or may be integral with another component of shared hardware 202. For example, memory controller 203 may be integral with one or more physical processors such as processor 110, a motherboard, an add on card, or other component of shared hardware 202, as described above in connection with memory controller 103 of FIG. 1. Without limitation, in embodiments memory controller 203 is integral with processor 110, wherein processor 110 is one or more physical single or multicore processors.

In addition to isolating allocated memory regions of main memory 207 from one another and protecting their content via encryption, memory controller 203 is also configured to enable verification of the integrity of data stored to allocated regions of main memory 207. In that regard, memory controller 203 may include integrity engine 205. Generally, integrity engine 205 may be in the form of hardware (circuitry), firmware, and/or software that is configured to perform integrity verification operations consistent with the present disclosure. In non-limiting embodiments, integrity engine 205 is in the form of circuitry that is configured to perform integrity verification operations consistent with the present disclosure. Alternatively or additionally, integrity engine 205 may include or be in the form of a processor that is configured to execute instructions stored in a computer readable storage medium (e.g., a driver, embedded firmware executed by the memory controller or an dedicated integrity processor, or the like), so as to cause memory controller 203 to perform integrity verification operations consistent with the present disclosure. It should also be understood that while integrity engine 205 is shown as being within memory controller 203, such a configuration is not required. For example, integrity engine 205 may be a standalone component or it may be incorporated into other shared hardware, such as processor 110.

The integrity verification operations generally include comparing a second integrity value in response to a read command issued by a first domain to a first integrity value generated in response to a write command issued by the first domain. In embodiments, the write command targets first physical addresses of a first allocated region of main memory of a host device, and the read command targets data stored to those first physical addresses. In response to the write command, the memory controller 203 may store the first integrity value and encrypted write data (i.e., ciphertext of the data to be written) to first physical addresses of a first allocated region of main memory. The memory controller 203 may further cause the first integrity value to be stored as metadata within the first allocated region in association with the encrypted write data, e.g., as shown in FIG. 2.

The memory controller 203 may generate the first integrity value in any suitable manner. In embodiments the memory controller is configured to generate the first integrity value in response at least in part by: performing first integrity operations on plaintext of the data targeted by the write command (i.e., plaintext write data) to produce a first output; performing second integrity operations on ciphertext of the write data (i.e., encrypted write data) to produce a second output; and combining at least the first and second outputs to generate the first integrity value. The memory controller 203 may then cause the encrypted write data and the first integrity value to be written to the first allocated region of main memory 207. For example and as noted above, the memory controller may cause the encrypted write data to be written to data storage bits within an allocated region of main memory 207 (e.g., region 209), and to cause the first integrity value to be stored in metadata bits associated with the data storage bits to which the encrypted write data is written.

Figure 4A:
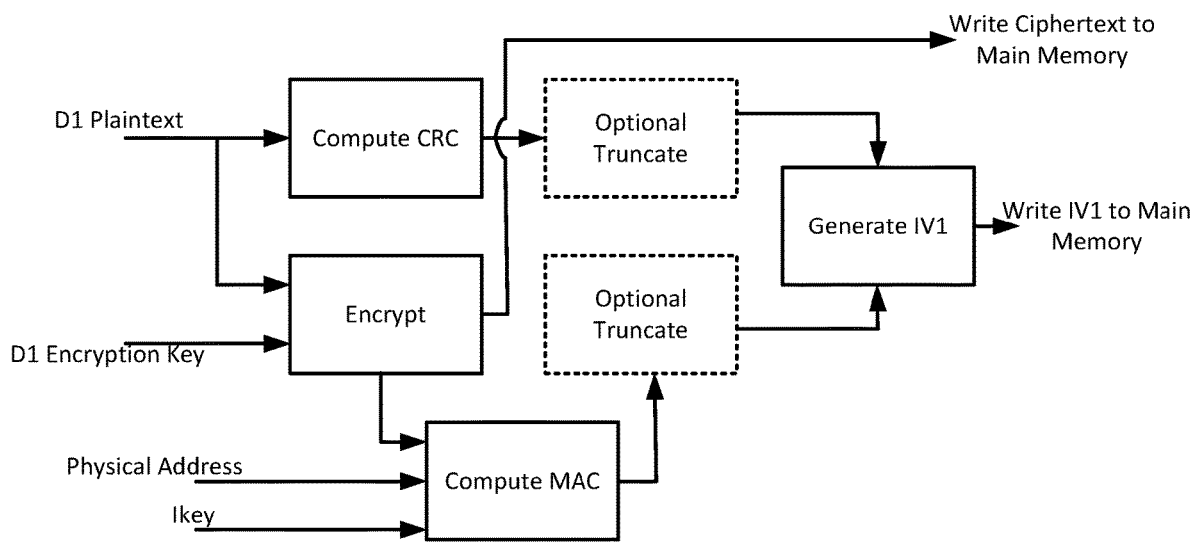
FIG. 4A is a block diagram illustrating one example of a data write flow consistent with the present disclosure.
Figure 4B:
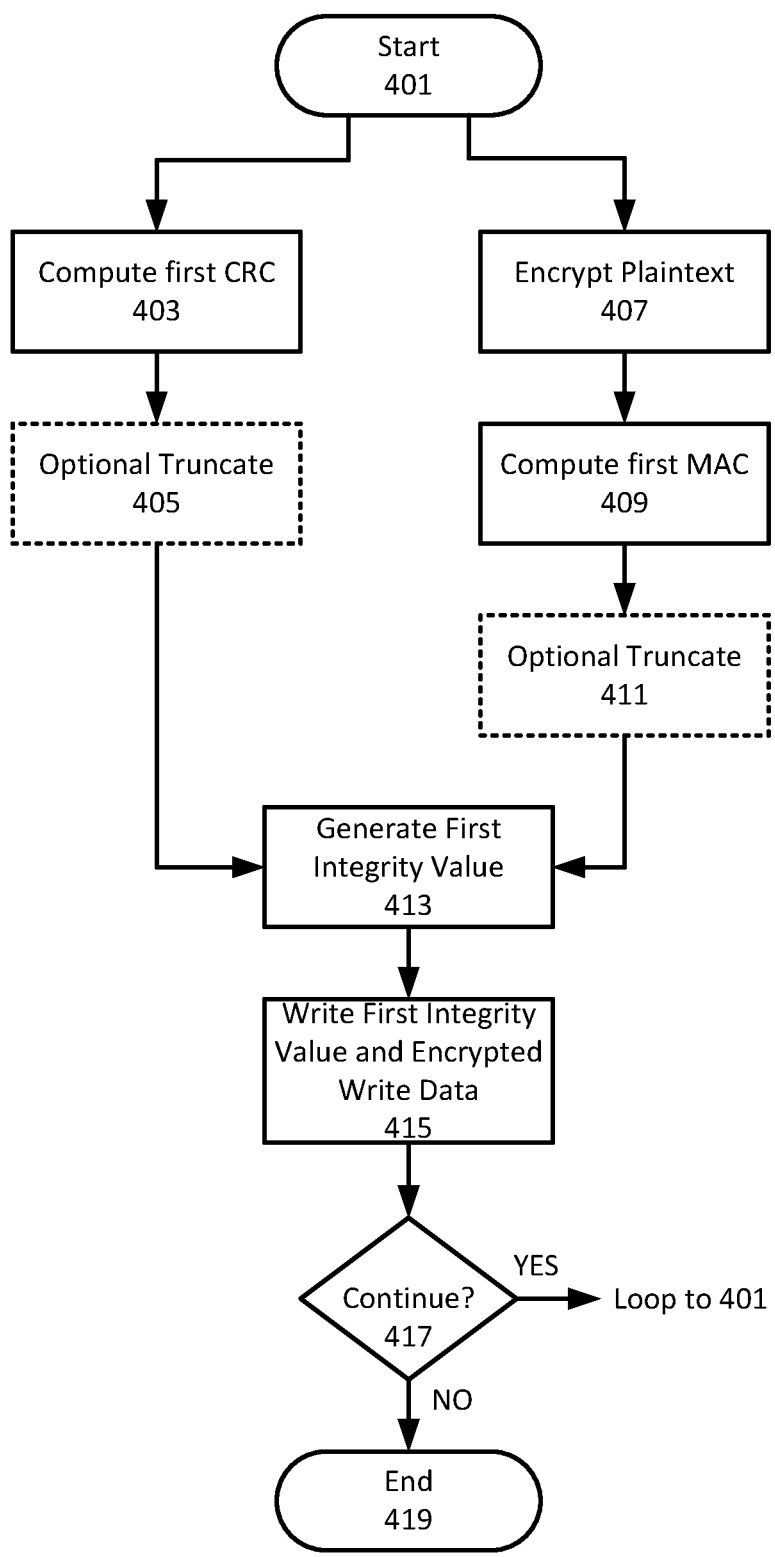
FIG. 4B is a flow chart of example operations of one example of a method of writing data consistent with the present disclosure.

In embodiments and as will be further described in conjunction with FIGS. 4A and 4B, the first integrity operations may include performing a cyclic redundancy check (CRC) on the plaintext of the write data to generate a first CRC value as a first output. In such embodiments the second integrity operations may include calculating a first message authentication code (MAC) based at least in part on ciphertext of the write data, wherein the first MAC is used as the second output. The first MAC may be generated based at least in part on the encrypted write data, one or more of the first physical addresses targeted by the write command, and an integrity key. The integrity key used to generate the MAC may be a domain specific integrity key, or it may be shared among all domains hosted by a host system. Without limitation, in embodiments the integrity key is shared among all domains hosted by a host system. As may be appreciated, use of a shared integrity key avoids the need to manage and secure domain specific integrity keys.

In embodiments the integrity key is not be fixed in the system, and may be altered or varied in a number of different ways. For example, the integrity key may be changed or varied in response to one or more system events, such as a system boot, system shutdown, system wake from hibernation, combinations thereof, and the like.

Several methods for computing a message authentication code are known, and any suitable method may be used to generate the first MAC. In embodiments, the message authentication code is hash based message authentication code (HMAC; also known as a keyed-hash message authentication code). An HMAC is one type of MAC that is determined using a cryptographic hash function and a secret cryptographic key. Any suitable cryptographic hash function may be used to determine an HMAC, such as one or more variants of the secure hash algorithm (SHA), such as SHA-2, SHA-3, (e.g., SHA-256, etc. or the like. Without limitation, in embodiments the memory controller 203 is configured to generate the first MAC using a SHA-256 HMAC algorithm and the integrity key. For example, the memory controller 203 may calculate the first MAC as shown in equation (I) below:

$$MAC\_FN(Ikey, Ciphertext, physical\ address, metadata) \qquad (I)$$

in which MAC_FN is the MAC function (e.g., SHA256-HMAC), Ikey is the integrity key, ciphertext is encrypted write data, physical address is the physical memory address (es) targeted by the write command, and metadata is any other data that may also be included. Of course, other methods for generating the first MAC may also be used.

As noted above, the memory controller 203 may be configured to generate a first integrity value by combining the first output (of first integrity operations) with the second output (of second integrity operations). In instances where the first output is a first CRC value and the second output is a first MAC, the first integrity value may be generated by the memory controller 203 by combining the first CRC value and the first MAC in any suitable manner Without limitation, in embodiments the memory controller 203 is configured to generate the first integrity value by conducting exclusive or (XOR) operations using the first CRC value and the first MAC. The memory controller 203 may also truncate the first CRC value and/or the first MAC prior to their combination, e.g., to limit the amount of memory needed to store the first integrity value.

As noted above the integrity verification operations include comparing a second integrity value in response to a read command issued by a first domain to the first integrity value. In general, the second integrity value is generated in substantially the same manner as the first integrity value but is determined using plaintext and ciphertext of read data targeted by the read command instead of plaintext and ciphertext of write data targeted by a write command More specifically, in response to a read command issued by the first domain, the memory controller 203 reads data targeted by the read command from the first region of main memory (e.g., encrypted read data), as well as a first integrity value associated with the encrypted read data. The memory controller 203 then decrypts the encrypted read data to produce plaintext read data. The memory controller may then generate the second integrity value at least in part by: performing third integrity operations on the plaintext read data to produce a third output; performing fourth integrity operations on the encrypted read data to produce a fourth output; and combining the third and fourth outputs to generate the second integrity value. Like the first and second outputs, the third and fourth outputs may be truncated prior to their combination to limit the amount of memory needed to store the second integrity value.

Apart from the data worked upon, the third integrity operations are the same as the first integrity operations used in the production of the first integrity value; the fourth integrity operations are the same as the second integrity operations used in the production of the first integrity value; and the third and fourth outputs are combined in the same manner as the first and second outputs in the production of the first integrity value. Put differently, identical operations are performed in the first and third integrity operations and the second and fourth integrity operations, but on (potentially) different data. More specifically, the first and second integrity operations used in the generation of the first integrity value operate on plaintext and encrypted write data (i.e., data that is the subject of a write command and is to be written to a first allocated region of main memory), whereas the third and fourth operations operate on plaintext and encrypted read data (i.e., data previously stored to a first allocated region of main memory). Thus, in embodiments the third integrity operations comprise generating a CRC value from plaintext write data; and generating a MAC from ciphertext write data, e.g., in the same manner described above regarding the production of the first integrity value.

As noted above the memory controller may verify the integrity of data stored to an allocated region of main memory by comparing the first integrity value to the second integrity value. Assuming the data targeted by the read command (encrypted read data) has not been tampered with (altered) after it was written to the first allocated region in response to a write command, the first integrity value and second integrity values will be the same or may differ by less than a threshold amount (e.g. in a lower security embodiment). In that instance the memory controller 203 may determine that the integrity verification has passed (i.e., that the integrity of the read data is verified). If the encrypted read data targeted by the read command has been altered (e.g., by an unauthorized write to the first allocated region or another attack), however, the first and second integrity values will be different or may differ by greater than a threshold amount (again, in a reduced security embodiment). In that case the memory controller 203 may determine that the integrity verification has failed (i.e., that the integrity of the read data has been compromised).

Figure 3:
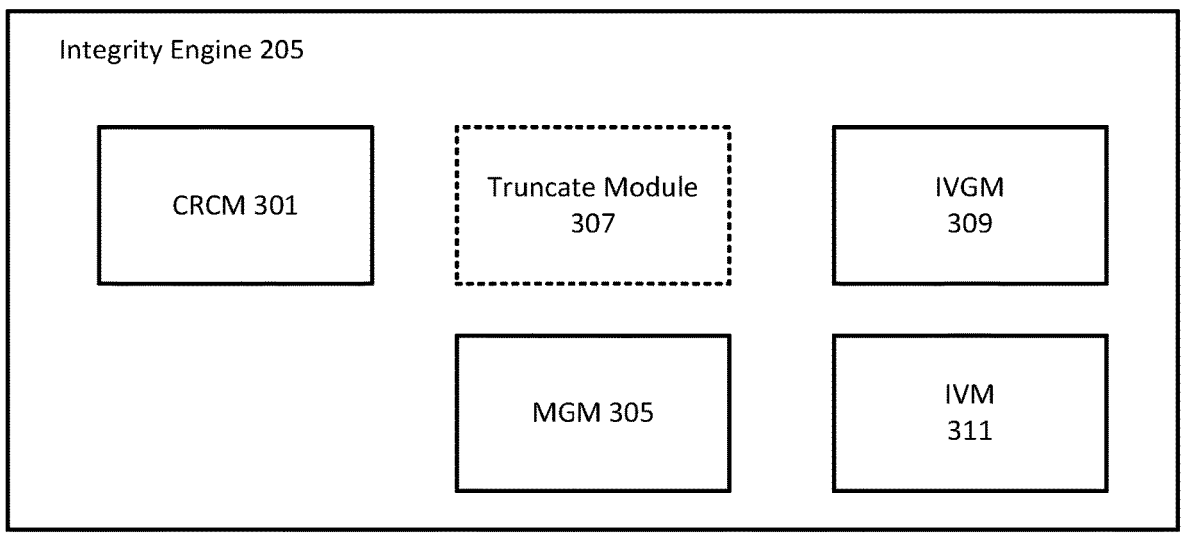
FIG. 3 is a block diagram illustrating one example of an integrity engine consistent with the present disclosure.

Returning to FIGS. 2 and 3, as noted above memory controller 203 may include integrity engine 205, or integrity engine may be a standalone component or integrated into another component such as processor 110. Regardless, integrity engine 205 may be implemented in hardware, firmware, or software, and may be configured to perform or cause the performance of integrity operations consistent with the present disclosure. In embodiments and as shown in FIG. 3, integrity engine 205 may include a cyclic redundancy check module (CRCM) 205, an, a MAC generation module (MGM) 305, an optional truncate module 307, an integrity value generation module (IVGM 309) and an integrity verification module (IVM) 311. In embodiments such modules may operate individually or in conjunction with one another to perform or cause the performance of integrity operations consistent with the present disclosure.

For the sake of example specific operations that may be performed by the modules of FIG. 3 will now be described in conjunction with the virtualized system 200 shown in FIG. 2. As a baseline it is assumed that system 200 hosts multiple domains (D1, DN), each of which is allocated virtual memory that is mapped to a corresponding region of physical main memory 207. More specifically, memory controller 203 in these embodiments is configure to service read/write commands that target virtual addresses of D1, DN that are mapped to physical addresses of first and second regions 209, 211 of main memory 207. Moreover, memory controller 203 in this embodiment is configured to isolate regions 209, 211 using range-based controls, and to cryptographically protect the content of regions 209, 211 using domain specific encryption keys. For the sake of this example it is assumed that D1 is an active domain that may be subject to an attack by DN. Thus, D1 may be understood to be the "victim domain," and DN may be understood to be the "attacking domain."

When it is active, D1 may issue write commands targeting virtual addresses within its virtual memory. In response, the memory controller 203 may determine that that write commands originated from D1. As discussed above, memory controller 203 (or, more specifically, KMEE 105) may encrypt the data targeted by the write command (i.e., write data) using a domain specific encryption key that is specific to D1, after which the memory controller 203 may cause the resulting encrypted write data to be written to physical addresses within the region 209.

Before, after, or concurrently with the writing of the encrypted write data, the integrity engine 205 may generate a first integrity value. In general, integrity engine 205 is configured to generate a first integrity value in the same manner described above. For example, CRCM 301 may be configured to perform or cause the performance of first integrity operations on the plaintext write data. The first integrity operations may be or include performing CRC operations on the plaintext write data to produce a CRC value. At the same or a different time, KMEE 105 may encrypt the plaintext write data to produce encrypted write data.

Simultaneously or at a different time, MGM 305 may perform or cause the performance of second integrity operations to produce a second output. The second integrity operations may be the same as those previously described. For example, in embodiments MGM 305 is configured to perform or cause the generation of a MAC based at least in part on encrypted write data and an integrity key (Ikey).

The CRC value and the MAC value may then be used as first and second outputs for the generation of a first integrity value, as previously explained. For example, IVGM 309 may be configured to combine or cause the combination of the CRC value and the MAC value to produce a first integrity value in any suitable manner. In embodiments, IVGM 309 is configured to produce a first integrity value by performing exclusive or (XOR) operations using the CRC value and the MAC value. The memory controller 203 may then cause the first integrity value to be stored (e.g., as metadata) in the first region 209 in association with the encrypted write data. That concept is shown in FIG. 2, which depicts first region 209 of main memory as including D1 ciphertext and D1 metadata, where D1 ciphertext is the encrypted write data and D1 metadata is the first integrity value associated with the encrypted write data. As this concept extends to other domains (e.g., DN), FIG. 2 also depicts region 211 as including DN ciphertext and DN metadata, wherein DN ciphertext is encrypted write data written in response to a write command issued by DN, and DN metadata is a first integrity value that was generated and written in the same manner described above and associated with DN ciphertext.

In embodiments main memory 207 includes a plurality of bits, wherein the plurality of bits may be allocated (e.g., by memory controller 203 or processor 110) into metadata bits and data storage bits, and wherein the metadata bits are mapped to or otherwise associated with corresponding data storage bits. In such instances encrypted write data may be written to the data storage bits of main memory 207, and the first integrity value may be written to metadata bits associated with the data storage bits to which the encrypted write data is written. In response to a read operation, memory controller 203 may cause encrypted read data targeted by the read command to be read from data storage bits. Concurrently or at another time, the memory controller 203 may also cause the first integrity value to be read from the metadata bits associated with the data storage bits in which the encrypted read data is stored.

Referring again to FIGS. 2 and 3, the integrity engine 205 may be configured to perform integrity operations to verify the integrity of the encrypted read data targeted by the read command. For example, KMEE 105 may decrypt the encrypted read data using a domain specific decryption key derived from a domain specific encryption key associated with D1, producing plaintext read data. CRCM 301 may then perform third integrity operations on the plaintext read data to generate a third output. In embodiments the third integrity operations include performing CRC operations on the plaintext read data to generate a CRC value as a third output. Notably, the CRC operations performed pursuant to the third integrity operations are the same as the CRC operations performed by CRCM 301 pursuant to the first integrity operations noted above. At the same or another time, MGM 305 may be configured to perform fourth integrity operations using the encrypted read data. In embodiments the fourth integrity operations include generating a MAC based at least in part on the encrypted read data and an integrity key (Hwy). Notably, the operations performed pursuant to the fourth integrity operations are the same as those performed pursuant to execution of the second integrity operations noted above. Optional truncate module 307 may truncate the third and fourth outputs (i.e., the CRC value and the MAC) to conserve memory (e.g., in the same manner the first and second outputs), or the third and fourth outputs may not be truncated (e.g., if the first and second outputs were not truncated).

IVGM 309 may then use the (optionally truncated) CRC value and the (optionally truncated) MAC to generate or cause the generation of a second integrity value. In embodiments, IVGM 309 may generate the second integrity value by performing exclusive or (XOR) operations using the CRC value and the MAC value. In sum, the operations performed to generate the second integrity value may be substantially the same as the operations performed to generate the first integrity value, but may potentially operate on different starting data.

IVM 311 is generally configured to perform or cause the performance of integrity verification operations on the encrypted read data. In embodiments, IVM 311 may verify the integrity of the encrypted read data by comparing the first integrity value and the second integrity value. As noted above, if the first and second integrity values are the same or differ by less than a threshold amount, IVM 311 may determine that the integrity of the encrypted read data has been maintained (i.e., passed). If the first and second integrity values are different or differ by more than a threshold amount, however, IVM 311 may determine that the integrity of the cipher text read data has been compromised, e.g., by an unauthorized write attempted by DN (as an attacking domain) or by another type of attack.

Another aspect of the present disclosure relates to methods for enabling verification of the integrity of data stored to a region of main memory allocated to a domain. In that regard reference is made to FIGS. 4A-5B. FIG. 4A is a block diagram illustrating one example of a data write flow consistent with the present disclosure, pursuant to which a first integrity value is generated. FIG. 4B is a flow chart of example operations of one example of a method 400 of writing data consistent with the present disclosure.

As shown in FIG. 4B the method 400 begins at block 401. The method may then proceed in parallel to blocks 403 and 407. Pursuant to block 403, a CRC value may be calculated based on plaintext of data that is the target of a write command (i.e. plaintext write data) issued by a first domain (D1). Pursuant to block 407, the plaintext write data is encrypted with a domain specific encryption key. These operations are illustrated in FIG. 4A, which illustrates D1 plaintext (i.e., plaintext write data) as an input to the computation of a CRC value and to an encryption block, where D1 encryption key is a domain specific encryption key associated with D1. Computation of the CRC value may be performed by a memory controller (e.g., memory controller 203) and/or one or more modules thereof (e.g., CRCM 301 of FIG. 3.

Following computation of the CRC pursuant to block 403, the method may proceed to optional block 405, pursuant to which the CRC value may be optionally truncated. This operation is illustrated in FIG. 4A by the output arrow extending from the compute CRC block to an optional truncate block. Consistent with the foregoing description, truncation of the CRC value may be performed by a memory controller (e.g., memory controller 203), or a module thereof (e.g., optional truncate module 307 in FIG. 3).

Encrypting the plaintext write data pursuant to block 407 produces encrypted write data. The method may then advance from block 407 to block 409, pursuant to which a MAC may be generated based at least in part on the encrypted write data. For example and as shown in FIG. 4A, a MAC may be generated based on the encrypted write data, the physical address of the memory region targeted by the write command, and an integrity key (Ikey) that may be domain specific or shared among domains hosted by a system on which the method is performed. As discussed above, the MAC may be produced by any suitable method, such as by executing operations consistent with the SHA-256 HMAC algorithm on the encrypted write data using the Ikey. Such operations may be performed, for example, by MGM 305 as previously described in conjunction with FIG. 3.

The method may then proceed to optional block 411, pursuant to which the MAC may be optionally truncated. This operation is illustrated in FIG. 4A by the output arrow extending from the compute MAC block to an optional truncate block. Consistent with the foregoing description, truncation of the MAC may be performed by a memory controller (e.g., memory controller 203), or a module thereof (e.g., optional truncate module 307 in FIG. 3).

Following generation of the (optionally truncated) CRC value and the optionally truncated MAC, the method may proceed to block 413, pursuant to which a first integrity value may be generated. For example and as described above, the first integrity value may be generated by combining the CRC value and the MAC in any suitable manner. In embodiments, the first integrity value is generated by XOR'ing the CRC value with the MAC, as explained previously. That concept is illustrated in FIG. 4A by the output arrows from the optional truncate blocks to the generate IV1 (first integrity value) block.

The method may then proceed to block 415, pursuant to which the first integrity value and the encrypted write data may be written to an allocated region of main memory of a host device. As discussed above, a memory controller may cause the encrypted write data to be written to data storage blocks within the allocated memory region, and cause the first integrity value to be written to metadata blocks that are associated with those data storage blocks. The method may then proceed to decision block 417, pursuant to which a decision may be made as to whether the method is to continue. If so the method may loop back to block 401 and repeat. But if not, the method may proceed to block 419 and end.

Figure 5A:
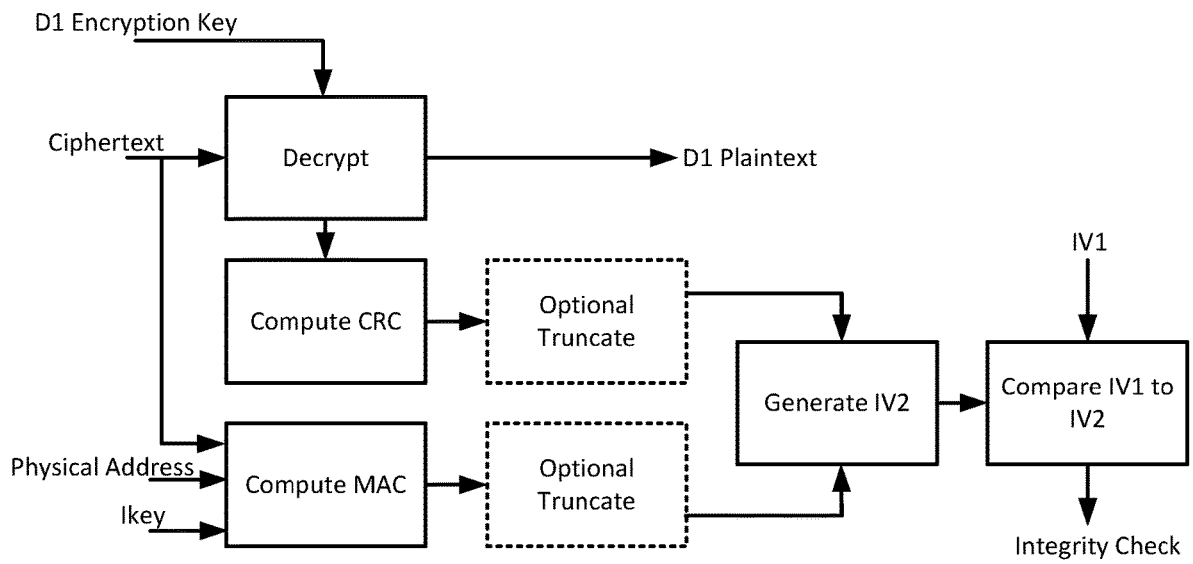
FIG. 5A is a block diagram illustrating one example of a data read flow consistent with the present disclosure.
Figure 5B:
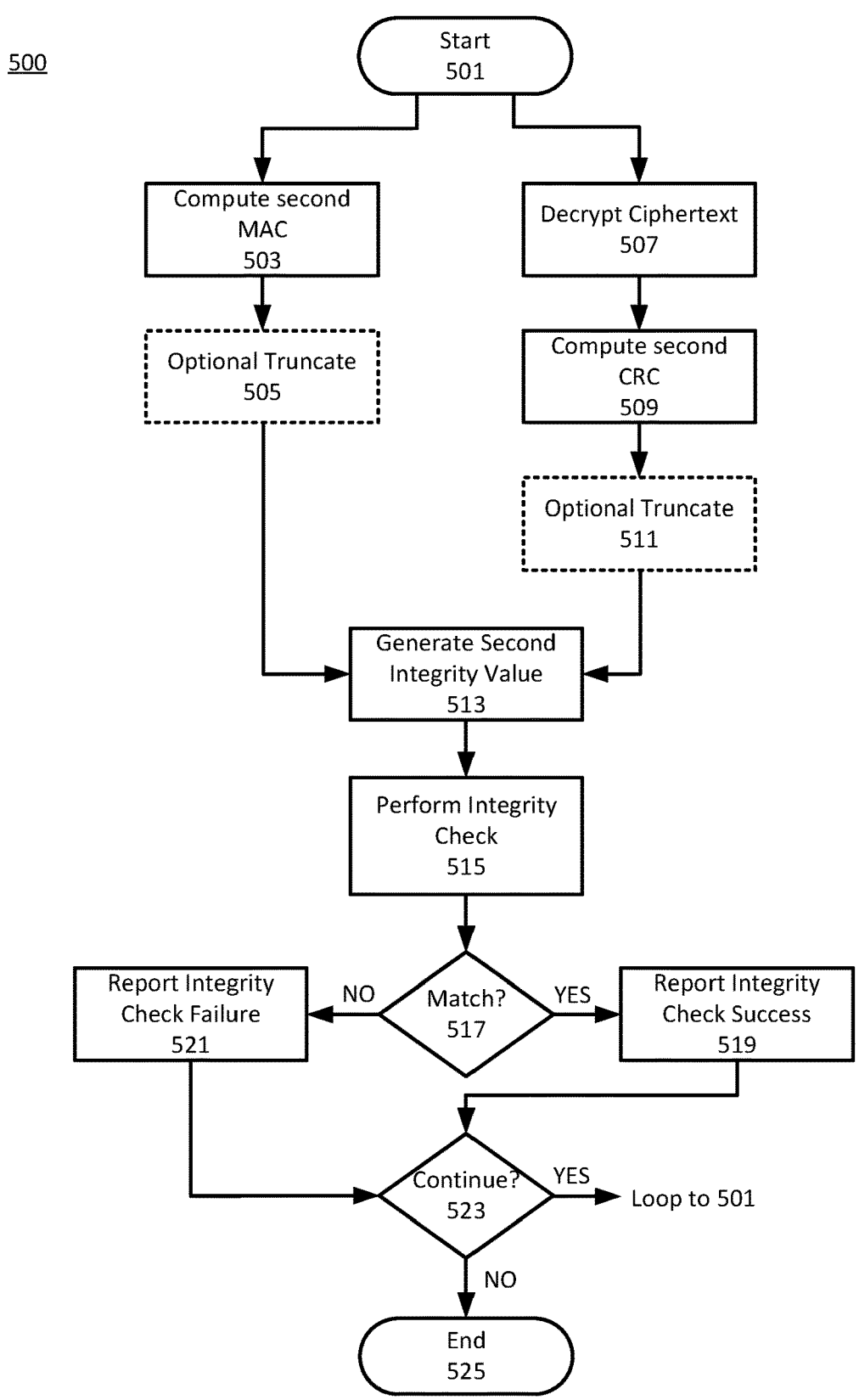
FIG. 5B is a flow chart of example operations of one example of a method of verifying the integrity of data stored to a region of physical main memory of a host device, consistent with the present disclosure.

FIG. 5A is a block diagram illustrating one example of a data read flow consistent with the present disclosure, and FIG. 5B is a flow chart of example operations of one example of a method 500 of verifying the integrity of data written to an allocated region of memory, consistent with the present disclosure. As shown in FIG. 5B the method 500 begins at block 501. The method may then proceed in parallel to blocks 503 and 507.

Pursuant to block 503, a second MAC may be determined based at least in part on encrypted read data that is the target of a read domain issued by a first domain (e.g., D1) and an integrity key (Ikey). The second MAC may be generated in the same manner as the first MAC generated pursuant to block 409 of FIG. 4B. Following generation of the second MAC, the method may proceed to optional block 505, pursuant to which the second MAC may be optionally truncated. Those operations are shown in FIG. 5A, which depicts encrypted read data (ciphertext), the physical addresses targeted by the read command, and the integrity key (Ikey) as inputs to a MAC block, with the output arrow of the MAC block leading to an optional truncate block.

Pursuant to block 507, the encrypted read data may be descripted by a memory controller or one or more modules thereof, as described previously. For example, the encrypted read data may be decrypted with a domain specific decryption key derived from a domain specific encryption key associated with D1. Those operations are illustrated in FIG. 5A, which shows a domain specific encryption key (D1 encryption key) and ciphertext (encrypted read data) as inputs to a decrypt block. The result of such operations is plaintext read data.

The method may then proceed to block 509, pursuant to which a second CRC value is generated based on the read data plaintext. Computation of the second CRC value may be performed by a memory controller (e.g., memory controller 203) and/or one or more modules thereof (e.g., CRCM 301 of FIG. 3). Following computation of the second CRC value pursuant to block 509, the method may proceed to optional block 511, pursuant to which the second CRC may be optionally truncated. This operation is illustrated in FIG. 5A by the output arrow extending from the compute CRC block to an optional truncate block. Consistent with the foregoing description, truncation of the second CRC value may be performed by a memory controller (e.g., memory controller 203), or a module thereof (e.g., optional truncate module 307 in FIG. 3).

Following generation of the (optionally truncated) second CRC value and the optionally truncated MAC, the method may proceed to block 513, pursuant to which a second integrity value may be generated. For example and as described above, the second integrity value may be generated in the same manner as the first integrity value. For example, the second integrity value may be generated by XOR'ing the second CRC value with the second MAC, as explained previously. That concept is illustrated in FIG. 5A by the output arrows from the optional truncate blocks to the generate IV2 (second integrity value) block.

The method may then proceed to block 515, pursuant to which an integrity check may be performed. As explained previously, the integrity check may be performed by comparing the second integrity value to the first integrity value. Following such comparison, the method may proceed to decision block 517, pursuant to which a decision may be made as to whether the first and second integrity values match. If the first and second integrity values are the same or differ by less than a threshold amount, the outcome of block 517 is yes and the method may proceed to block 519, pursuant to which the integrity check may be reported as successful (i.e., the integrity of the encrypted read data is confirmed). If the first and second integrity values are different or differ by greater than a threshold amount, the outcome of block 517 is NO and the method may proceed to block 521, pursuant to which the integrity check may be reported as a failure (i.e., the integrity of the encrypted read data has been compromised.

In either case the method may proceed from block 519 or 521 to block 523, pursuant to which a decision may be made as to whether the method is to continue. If so, the method may loop back to block 501. But if not, the method may proceed to block 525 and end.

Another aspect of the present disclosure relates to a computer readable storage medium that contains computer readable instructions which when executed by a processor cause the processor (or a device containing the processor) to perform integrity operations consistent with the present disclosure. When used the computer readable storage medium may be in the form of an article of manufacture. In some examples, the computer readable storage medium may be a non-transitory computer readable medium or machine readable storage medium, such as but not limited to an optical, magnetic or semiconductor storage medium. In any case the storage medium may store various types of computer executable instructions, such as instructions to the operations of the method of one or more of FIGS. 4B and 5B. Non-limiting examples of suitable computer readable storage media that may be used include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

EXAMPLES

The following examples pertain to further embodiments. The following examples of the present disclosure may comprise subject material such as a system, a device, a method, a computer readable storage medium storing instructions that when executed cause a machine to perform acts based on the method, and/or means for performing acts based on the method, as provided below.

Example 1

According to this example there is provided a method of verifying the integrity of data stored to main memory of a host device, including, with a memory controller of the host device: generating a first integrity value in response to a write command from a first domain, the write command targeting first physical addresses of a first allocated region of the main memory; generating a second integrity value in response a read command from the first domain, the read command targeting read data stored to the first physical addresses; and verifying the integrity of the read data at least in part by comparing the first integrity value to the second integrity value; wherein: generating the first integrity value includes: performing first integrity operations on plaintext of write data targeted by the write command to produce a first output; performing second integrity operations on ciphertext of the write data to be written in response to the write command to produce a second output; combining the first and second outputs to generate the first integrity value; and the method further includes, with the memory controller: causing the first integrity value to be written to the first allocated region of the main memory.

Example 2

This example includes any or all of the features of example 1, wherein: the first integrity operations comprise performing a cyclic redundancy check (CRC) from the plaintext of the write data to generate a first CRC value; the second integrity operations comprise generating a first message authentication code (MAC) from the ciphertext of the write data; and the first output is the first CRC value, and the second output is the first MAC.

Example 3

This example includes any or all of the features of example 2, wherein the first MAC is generated based at least in part on the ciphertext of the write data, one or more of the first physical addresses, and an integrity key.

Example 4

This example includes any or all of the features of any one of examples 1 to 3, wherein generating the second integrity value includes: reading ciphertext of the read data targeted by the read command from the first physical addresses; decrypting the ciphertext of the read data to obtain plaintext read data; performing third integrity operations on the plaintext read data to obtain a third output; and performing fourth integrity operations on the ciphertext read data to obtain a fourth output; and combining the third and fourth outputs to generate the second integrity value.

Example 5

This example includes any or all of the features of example 4, wherein: the third integrity operations comprise performing a cyclic redundancy check (CRC) on the plaintext read data to generate a second CRC value; the fourth integrity operations comprise generating a second message authentication code (MAC) from the ciphertext read data; and the third output is the second CRC value, and the fourth output is the second MAC.

Example 6

This example includes any or all of the features of example 5, wherein the second MAC is generated based at least in part on the ciphertext read data, one or more of the first physical addresses, and an integrity key.

Example 7

This example includes any or all of the features of any one of examples 1 to 6, wherein the method further includes, with the memory controller: concurrently reading the first integrity value and the ciphertext read data from the first allocated region of the main memory.

Example 8

This example includes any or all of the features of any one of examples 1 to 7, wherein: verifying the integrity of the read data succeeds when the first integrity value and the second integrity value are the same; and verifying the integrity of the read data fails when the first integrity value and the second integrity value are different.

Example 9

This example includes any or all of the features of example 8, wherein: verifying the integrity of the read data is based only on the comparison of the first integrity value and the second integrity value.

Example 10

This example includes any or all of the features of any one of examples 1 to 9, wherein the method further includes, with the memory controller: isolating the first allocated region of the main memory from a second allocated region of the main memory; wherein the first allocated region is associated with a first domain of the host device and the second allocated region is associated with a second domain of the host device.

Example 11

This example includes any or all of the features of example 10, wherein the memory controller is to isolate the first allocated region from the second allocated region using range-based controls.

Example 12

This example includes any or all of the features of example 10 or 11, wherein the method further includes, with the memory controller: encrypting data to be written to the first allocated region of main memory with a first domain specific encryption key, and encrypting data to be written to the second allocated region of main memory with a second domain specific encryption key.

Example 13

This example includes any or all of the features of example 1, wherein the method further includes, with the memory controller: causing ciphertext of the write data to be written to first data storage bits within the first allocated region of the main memory; and causing the first integrity value to be written to first metadata bits within the first allocated region of the main memory; wherein the first metadata bits are associated with the first data storage bits.

Example 14

According to this example there is provided a non-transitory computer readable storage medium including instructions that when executed by a processor of a host system cause the performance of the following operations including, with a memory controller of a host device: generating a first integrity value in response to a write command from a first domain, the write command targeting first physical addresses of a first allocated region of the main memory; generating a second integrity value in response a read command from the first domain, the read command targeting read data stored to the first physical addresses; and verifying the integrity of the read data at least in part by comparing the first integrity value to the second integrity value; wherein: generating the first integrity value includes: performing first integrity operations on plaintext of write data targeted by the write command to produce a first output; performing second integrity operations on ciphertext of the write data to be written in response to the write command to produce a second output; combining the first and second outputs to generate the first integrity value; and the method further includes, with the memory controller: causing the first integrity value to be written to the first allocated region of the main memory.

Example 15

This example includes any or all of the features of example 14, wherein: the first integrity operations comprise performing a cyclic redundancy check (CRC) from the plaintext of the write data to generate a first CRC value; the second integrity operations comprise generating a first message authentication code (MAC) from the ciphertext of the write data; the first output is the first CRC value, and the second output is the first MAC.

Example 16

This example includes any or all of the features of example 15, wherein the first MAC is generated based at least in part on the ciphertext of the write data, one or more of the first physical addresses, and an integrity key.

Example 17

This example includes any or all of the features of any one of examples 14 to 16, wherein generating the second integrity value includes: reading ciphertext of the read data targeted by the read command from the first physical addresses; decrypting the ciphertext of the read data to obtain plaintext read data; performing third integrity operations on the plaintext read data to obtain a third output; and performing fourth integrity operations on the ciphertext read data to obtain a fourth output; and combining the third and fourth outputs to generate the second integrity value.

Example 18

This example includes any or all of the features of example 17, wherein: the third integrity operations comprise performing a cyclic redundancy check (CRC) on the plaintext read data to generate a second CRC value; the fourth integrity operations comprise generating a second message authentication code (MAC) from the ciphertext read data; and the third output is the second CRC value, and the fourth output is the second MAC.

Example 19

This example includes any or all of the features of example 18, wherein the second MAC is generated based at least in part on the ciphertext read data, one or more of the first physical addresses, and an integrity key.

Example 20

This example includes any or all of the features of one of examples 14 to 19, wherein the instructions when executed by the processor further cause the performance of the following operations including, with the memory controller: concurrently reading the first integrity value and the ciphertext read data from the first allocated region of the main memory.

Example 21

This example includes any or all of the features of any one of examples 14 to 20, wherein: verifying the integrity of the read data succeeds when the first integrity value and the second integrity value are the same; and verifying the integrity of the read data fails when the first integrity value and the second integrity value are different.

Example 22

This example includes any or all of the features of example 21, wherein: verifying the integrity of the read data is based only on the comparison of the first integrity value and the second integrity value.

Example 23

This example includes any or all of the features of any one of examples 14 to 22, wherein the instructions when executed by the processor further result in the performance of the following operations including, with the memory controller: isolating the first allocated region of the main memory from a second allocated region of the main memory; wherein the first allocated region is associated with a first domain of the host device and the second allocated region is associated with a second domain of the host device.

Example 24

This example includes any or all of the features of example 23, wherein the memory controller is to isolate the first allocated region from the second allocated region using range-based controls.

Example 25

This example includes any or all of the features of any one of examples 23 and 24, wherein the instructions when executed by the processor further cause the performance of the following operations including, with the memory controller: encrypting data to be written to the first allocated region of main memory with a first domain specific encryption key, and encrypting data to be written to the second allocated region of main memory with a second domain specific encryption key.

Example 26

This example includes any or all of the features of example 14, wherein the instructions when executed by the processor further result in the performance of the following operations including, with the memory controller: causing ciphertext of the write data to be written to first data storage bits within the first allocated region of the main memory; and causing the first integrity value to be written to first metadata bits within the first allocated region of the main memory; wherein the first metadata bits are associated with the first data storage bits.

Example 27

According to this example there is provided a memory controller to enable integrity verification of data stored to main memory of a host device, including circuitry configured to: generate a first integrity value in response to a write command from a first domain, the write command targeting first physical addresses of a first allocated region of the main memory; generate a second integrity value in response a read command from the first domain, the read command targeting read data stored to the first physical addresses; and verify the integrity of the read data at least in part by comparing the first integrity value to the second integrity value wherein: the circuitry is to generate the first integrity value at least in part by: performing first integrity operations on plaintext of write data targeted by the write command to produce a first output; performing second integrity operations on ciphertext of the write data to be written in response to the write command to produce a second output; and combining the first and second outputs to generate the first integrity value; and the circuitry is further configured to cause the first integrity value to be written to the first allocated region of the main memory.

Example 28

This example includes any or all of the features of example 27, wherein: the first integrity operations comprise performing a cyclic redundancy check (CRC) from the plaintext of the write data to generate a first CRC value; the second integrity operations comprise generating a first message authentication code (MAC) from the ciphertext of the write data; the first output is the first CRC value, and the second output is the first MAC.

Example 29

This example includes any or all of the features of example 28, wherein the circuitry is to generate the first MAC based at least in part on the ciphertext of the write data, one or more of the first physical addresses, and an integrity key.

Example 30

This example includes any or all of the features of any one of examples 27 to 29, wherein the circuitry is to generate the second integrity value at least in part by: reading ciphertext of the read data targeted by the read command from the first physical addresses; decrypting the ciphertext of the read data to obtain plaintext read data performing third integrity operations on the plaintext read data to obtain a third output; and performing fourth integrity operations on the ciphertext read data to obtain a fourth output; and combining the third and fourth outputs to generate the second integrity value.

Example 31

This example includes any or all of the features of example 30, wherein: the third integrity operations comprise performing a cyclic redundancy check (CRC) on the plaintext read data to generate a second CRC value; the fourth integrity operations comprise generating a second message authentication code (MAC) from the ciphertext read data; and the third output is the second CRC value, and the fourth output is the second MAC.

Example 32

This example includes any or all of the features of example 31, wherein the circuitry is to generate the second MAC based at least in part on the ciphertext read data, one or more of the first physical addresses, and an integrity key.

Example 33

This example includes any or all of the features of any one of examples 27 to 32, wherein the circuitry is further configured to concurrently read the first integrity value and the ciphertext read data from the first allocated region of the main memory.

Example 34

This example includes any or all of the features of any one of examples 27 to 33, wherein: verifying the integrity of the read data succeeds when the first integrity value and the second integrity value are the same; and verifying the integrity of the read data fails when the first integrity value and the second integrity value are different.

Example 35

This example includes any or all of the features of example 34, wherein: the circuitry is to verify the integrity of the read data based only on the comparison of the first integrity value and the second integrity value.

Example 36

This example includes any or all of the features of any one of examples 27 to 35, wherein: the circuitry is further configured isolate the first allocated region of the main memory from a second allocated region of the main memory; and the first allocated region is associated with a first domain of the host device and the second allocated region is associated with a second domain of the host device.

Example 37

This example includes any or all of the features of example 36, wherein the circuitry is to isolate the first allocated region from the second allocated region using range-based controls.

Example 38

This example includes any or all of the features of example 35 or 36, wherein the circuitry is further configured to: encrypt data to be written to the first allocated region of main memory with a first domain specific encryption key, and encrypt data to be written to the second allocated region of main memory with a second domain specific encryption key.

Example 39

This example includes any or all of the features of example 27, wherein the circuitry is further configured to: cause ciphertext of the write data to be written to first data storage bits within the first allocated region of the main memory; and cause the first integrity value to be written to first metadata bits within the first allocated region of the main memory; wherein the first metadata bits are associated with the first data storage bits.

As may be appreciated the technologies of the present disclosure provide a relatively light weight mechanism for enabling the verification of the integrity of memory allocated across multiple domains. As the technologies described herein leverage the use of a per-domain encryption key but do not require the use of a per-domain integrity key, the complexity of managing per-domain integrity keys is avoided. Moreover, first integrity values generated during write operations may be stored in metadata bits that are associated with data storage bits that store the encrypted write data. Consequently, during read operations encrypted read data and a first integrity value associated with the encrypted data may be read concurrently (or nearly concurrently) from an allocated region of memory in response to a read command. This can reduce or eliminate excess memory accesses, resulting in a corresponding decrease in the overhead needed to implement integrity verification.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method of verifying the integrity of data stored to main memory of a host device, comprising, with a memory controller of the host device:
generating a first integrity value in response to a write command from a first domain, the write command targeting at least one first physical address of a first allocated region of said main memory;
generating a second integrity value in response to a read command from the first domain, the read command targeting read data stored to the at least one first physical address; and
verifying the integrity of the read data at least in part by comparing the first integrity value to the second integrity value;
wherein:
generating the first integrity value comprises:
performing first integrity operations on plaintext of write data targeted by the write command to produce a first output;
performing second integrity operations on an integrity key and ciphertext of the write data to be written in response to the write command to produce a second output, wherein the integrity key is different from an encryption key used to generate the ciphertext, wherein the encryption key is specific to the first domain and the integrity key is used by each of a plurality of domains of the host device in respective integrity operations of the plurality of domains;
combining the first and second outputs to generate the first integrity value; and
the method further comprises, with the memory controller:
causing the first integrity value to be written to the first allocated region of said main memory.

2. The method of claim 1, wherein:
said first integrity operations comprise performing a cyclic redundancy check (CRC) from the plaintext of said write data to generate a first CRC value;
said second integrity operations comprise generating a first message authentication code (MAC) from the ciphertext of said write data and the integrity key;
said first output is said first CRC value, and said second output is said first MAC.

3. The method of claim 1, wherein generating the second integrity value comprises:
reading ciphertext of the read data targeted by the read command from the at least one first physical address;
decrypting the ciphertext of the read data to obtain plaintext read data;
performing third integrity operations on the plaintext read data to obtain a third output; and
performing fourth integrity operations on the ciphertext read data to obtain a fourth output; and
combining the third and fourth outputs to generate the second integrity value.

4. The method of claim 3, wherein:
said third integrity operations comprise performing a cyclic redundancy check (CRC) on said plaintext read data to generate a second CRC value;

said fourth integrity operations comprise generating a second message authentication code (MAC) from the ciphertext read data; and said third output is said second CRC value, and said fourth output is said second MAC.

5. The method of claim 1, wherein:

verifying the integrity of the read data succeeds when the first integrity value and the second integrity value are the same; and verifying the integrity of the read data fails when the first integrity value and the second integrity value are different.

6. The method of claim 1, further comprising, with said memory controller:

isolating said first allocated region of said main memory from a second allocated region of said main memory;

wherein said first allocated region is associated with a first domain of the host device and the second allocated region is associated with a second domain of the host device.

7. The method of claim 6, wherein said memory controller is to:

isolate the first allocated region from the second allocated region using range-based controls; and encrypt data to be written to the first allocated region of main memory with a first domain specific encryption key, and encrypt data to be written to the second allocated region of main memory with a second domain specific encryption key.

8. The method of claim 1, further comprising, with the memory controller:

causing ciphertext of the write data to be written to first data storage bits within the first allocated region of said main memory; and causing the first integrity value to be written to first metadata bits within the first allocated region of said main memory;

wherein said first metadata bits are associated with said first data storage bits.

9. A non-transitory computer readable storage medium comprising instructions that when executed by a processor of a host system cause the performance of the following operations comprising, with a memory controller of a host device:

generating a first integrity value in response to a write command from a first domain, the write command targeting at least one first physical address of a first allocated region of a main memory;

generating a second integrity value in response to a read command from the first domain, the read command targeting read data stored to the at least one first physical address; and verifying the integrity of the read data at least in part by comparing the first integrity value to the second integrity value;

wherein:

generating the first integrity value comprises:

performing first integrity operations on plaintext of write data targeted by the write command to produce a first output;

performing second integrity operations on an integrity key and ciphertext of the write data to be written in response to the write command to produce a second output, wherein the integrity key is different from an encryption key used to generate the ciphertext, wherein the encryption key is specific to the first domain and the integrity key is used by each of a plurality of domains of the host device in respective integrity operations of the plurality of domains;

combining the first and second outputs to generate the first integrity value; and the method further comprises, with the memory controller:

causing the first integrity value to be written to the first allocated region of said main memory.

10. The non-transitory computer readable storage medium of claim 9, wherein:

said first integrity operations comprise performing a cyclic redundancy check (CRC) from the plaintext of said write data to generate a first CRC value;

said second integrity operations comprise generating a first message authentication code (MAC) from the ciphertext of said write data;

said first output is said first CRC value, and said second output is said first MAC.

11. The non-transitory computer readable storage medium of claim 9, wherein generating the second integrity value comprises:

reading ciphertext of the read data targeted by the read command from the at least one first physical address;

decrypting the ciphertext of the read data to obtain plaintext read data;

performing third integrity operations on the plaintext read data to obtain a third output; and performing fourth integrity operations on the ciphertext read data to obtain a fourth output; and combining the third and fourth outputs to generate the second integrity value.

12. The non-transitory computer readable storage medium of claim 11, wherein:

said third integrity operations comprise performing a cyclic redundancy check (CRC) on said plaintext read data to generate a second CRC value;

said fourth integrity operations comprise generating a second message authentication code (MAC) from the ciphertext read data; and said third output is said second CRC value, and said fourth output is said second MAC.

13. The non-transitory computer readable storage medium of claim 11, wherein said instructions when executed by said processor further cause the performance of the following operations comprising, with said memory controller:

concurrently reading said first integrity value and said ciphertext read data from said first allocated region of said main memory.

14. The non-transitory computer readable storage medium of claim 9, wherein:

verifying the integrity of the read data succeeds when the first integrity value and the second integrity value are the same; and verifying the integrity of the read data fails when the first integrity value and the second integrity value are different.

15. The non-transitory computer readable storage medium of claim 14, wherein:

verifying the integrity of the read data is based only on the comparison of the first integrity value and the second integrity value.

16. The non-transitory computer readable storage medium of claim 9, wherein said instructions when executed by said processor further result in the performance of the following operations comprising, with said memory controller:

isolating said first allocated region of said main memory from a second allocated region of said main memory;

wherein said first allocated region is associated with a first domain of the host device and the second allocated region is associated with a second domain of the host device.

17. The non-transitory computer readable storage medium of claim 9, wherein said instructions when executed by said processor further result in the performance of the following operations comprising, with the memory controller:
causing ciphertext of the write data to be written to first data storage bits within the first allocated region of said main memory; and
causing the first integrity value to be written to first metadata bits within the first allocated region of said main memory;
wherein said first metadata bits are associated with said first data storage bits.

18. A memory controller to enable integrity verification of data stored to main memory of a host device, comprising circuitry configured to:
generate a first integrity value in response to a write command from a first domain, the write command targeting at least one first physical address of a first allocated region of said main memory;
generate a second integrity value in response to a read command from the first domain, the read command targeting read data stored to the at least one first physical address; and
verify the integrity of the read data at least in part by comparing the first integrity value to the second integrity value;
wherein:
the circuitry is to generate the first integrity value at least in part by:
performing first integrity operations on plaintext of write data targeted by the write command to produce a first output;
performing second integrity operations on an integrity key and ciphertext of the write data to be written in response to the write command to produce a second output wherein the integrity key is different from an encryption key used to generate the ciphertext, wherein the encryption key is specific to the first domain and the integrity key is used by each of a plurality of domains of the host device in respective integrity operations of the plurality of domains; and
combining the first and second outputs to generate the first integrity value; and
the circuitry is further configured to:
cause the first integrity value to be written to the first allocated region of said main memory.

19. The memory controller of claim 18, wherein:
said first integrity operations comprise performing a cyclic redundancy check (CRC) from the plaintext of said write data to generate a first CRC value;
said second integrity operations comprise generating a first message authentication code (MAC) from the ciphertext of said write data;
said first output is said first CRC value, and said second output is said first MAC.

20. The memory controller of claim 18, wherein the circuitry is to generate the second integrity value at least in part by:
reading ciphertext of the read data targeted by the read command from the at least one first physical address;
decrypting the ciphertext of the read data to obtain plaintext read data;
performing third integrity operations on the plaintext read data to obtain a third output; and
performing fourth integrity operations on the ciphertext read data to obtain a fourth output; and
combining the third and fourth outputs to generate the second integrity value.

21. The memory controller of claim 20, wherein:
said third integrity operations comprise performing a cyclic redundancy check (CRC) on said plaintext read data to generate a second CRC value;
said fourth integrity operations comprise generating a second message authentication code (MAC) from the ciphertext read data; and
said third output is said second CRC value, and said fourth output is said second MAC.

22. The memory controller of claim 18, wherein:
verifying the integrity of the read data succeeds when the first integrity value and the second integrity value are the same; and
verifying the integrity of the read data fails when the first integrity value and the second integrity value are different.

23. The memory controller of claim 18, wherein:
said circuitry is further configured isolate said first allocated region of said main memory from a second allocated region of said main memory; and
said first allocated region is associated with a first domain of the host device and the second allocated region is associated with a second domain of the host device.

24. The memory controller of claim 23, wherein said circuitry is to:
isolate the first allocated region from the second allocated region using range-based controls; and
encrypt data to be written to the first allocated region of main memory with a first domain specific encryption key, and encrypt data to be written to the second allocated region of main memory with a second domain specific encryption key.

25. The memory controller of claim 18, wherein said circuitry is further configured to:
cause ciphertext of the write data to be written to first data storage bits within the first allocated region of said main memory; and
cause the first integrity value to be written to first metadata bits within the first allocated region of said main memory;
wherein said first metadata bits are associated with said first data storage bits.

26. The method of claim 1, wherein the second integrity operations are performed on the ciphertext of the write data, the integrity key, and a physical memory address targeted by the write command.

* * * * *